US009923653B2

United States Patent
Ise

(10) Patent No.: US 9,923,653 B2
(45) Date of Patent: Mar. 20, 2018

(54) AUDIO SYSTEM

(71) Applicant: Alpine Electronics, Inc., Shinagawa-ku, Tokyo (JP)

(72) Inventor: Tomohiko Ise, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 15/387,277

(22) Filed: Dec. 21, 2016

(65) Prior Publication Data
US 2017/0264384 A1 Sep. 14, 2017

(30) Foreign Application Priority Data

Mar. 9, 2016 (JP) .................. 2016-045667

(51) Int. Cl.
| | |
|---|---|
| H04L 27/06 | (2006.01) |
| H04H 40/18 | (2008.01) |
| H04H 20/86 | (2008.01) |
| H04R 3/12 | (2006.01) |

(52) U.S. Cl.
CPC ............ *H04H 40/18* (2013.01); *H04H 20/86* (2013.01); *H04R 3/12* (2013.01); *H04R 2499/13* (2013.01)

(58) Field of Classification Search
CPC ....................................................... H04H 40/18
USPC ......................................................... 375/344
See application file for complete search history.

(56) References Cited

U.S. PATENT DOCUMENTS

| | | | |
|---|---|---|---|
| 5,432,511 A | 7/1995 | Sadjadian et al. | |
| 8,006,007 B1 | 8/2011 | Barkana | |
| 2002/0167972 A1* | 11/2002 | Okamoto | G01S 7/5208 370/535 |
| 2004/0032922 A1 | 2/2004 | Knapp et al. | |
| 2008/0068234 A1 | 3/2008 | Forman et al. | |
| 2015/0003456 A1* | 1/2015 | Seo | H04L 12/28 370/392 |
| 2015/0365255 A1 | 12/2015 | Gunther | |

FOREIGN PATENT DOCUMENTS

| | | |
|---|---|---|
| JP | 2016-07710 | 5/2012 |
| JP | 2016-19031 | 2/2016 |
| WO | 2015/188220 | 12/2015 |

OTHER PUBLICATIONS

Extended European Search Report in European Application No. 17150983.9, dated Jul. 24, 2017.

* cited by examiner

*Primary Examiner* — Lihong Yu
(74) *Attorney, Agent, or Firm* — Brinks Gilson & Lione

(57) ABSTRACT

A digital tuner in a broadcasting receiving unit outputs audio data at a sample rate of Fs+dr (Hz), and an ASRC rate-converts audio data to audio data at a sample rate of Fs+ds (Hz) and transmits the resulting audio data to an audio processing unit. A DAC in the audio processing unit analog-converts the received audio data at an output rate of Fs+da (Hz) and outputs the resulting audio data to a speaker. The sample rate Fs+ds and the output rate Fs+da are synchronized with a SYNC transmitted from the broadcasting receiving unit to the audio processing unit on a 125 ms cycle. For the sample rate Fs+ds and the output rate Fs+da, a relationship of (da−ds)×0.125<1 is assured.

5 Claims, 5 Drawing Sheets

AUDIO SYSTEM

RELATED APPLICATIONS

The present application claims priority to Japanese Patent Appln. No. 2016-045667, filed Mar. 9, 2016, the entire disclosure of which is hereby incorporated by reference.

BACKGROUND

1. Field of the Disclosure

The present disclosure relates to an audio system including a plurality of units connected via a network.

2. Description of the Related Art

Known audio systems (as in Japanese Unexamined Patent Application Publication Nos. 2016-5269 and 2016-19031) may include a plurality of units connected via a network using an ETHERNET ("ETHERNET" is a registered trademark) AVB (Audio Video Bridging) standard (IEEE802.1 Qav, IEEE802.1 Qat, IEEE802.1 AS, IEEE802.1 BA).

As a technology for converting the sample rate of audio data, an ASRC (Asynchronous Sample Rate Converter) is known which generates audio data at a sample rate asynchronous with the sample rate of original audio data (as in Japanese Unexamined Patent Application Publication Open Nos. 2009-504107 and 6-260887).

In an audio system including a plurality of units connected via an ETHERNET AVB based network, different units performing reception and output of digital radio broadcasting may cause problems.

As an example, an audio system will be described which includes a broadcasting receiving unit 100 and an audio processing unit 200 connected via an ETHERNET AVB based network, as illustrated in FIG. 4.

The broadcasting receiving unit 100 includes a digital tuner 101 configured to receive digital radio broadcasting, a transmission buffer 102, and an ETHERNET AVB controller 103. The audio processing unit 200 includes an ETHERNET AVB controller 201, a reception buffer 202, a DAC 203 (digital-analog converter 203), an amplifier 204, and a processing clock generating unit 205. A speaker 300 is connected to the audio processing unit 200.

In this configuration, the digital tuner 101 in the broadcasting receiving unit 100 is configured to perform an operation for receiving digital radio broadcasting synchronized with clocks of the radio broadcasting station 400, which are contained in digital radio broadcasting for broadcasting, generate audio data at a sample rate Fs+dr (Hz), and store them in the transmission buffer 102. Here, Fs is a normal sample rate of audio data, and dr is an error with respect to the normal sample rate of the sample rate of audio data received from the radio broadcasting station 400. After audio data are stored in the transmission buffer 102, the ETHERNET AVB controller 103 in the broadcasting receiving unit 100 transmits the stored audio data in the audio processing unit 200.

The ETHERNET AVB controller 201 in the audio processing unit 200 is configured to receive audio data transmitted from the broadcasting receiving unit 100 and store them in the reception buffer 202. The DAC 203 is configured to read and analog-convert audio data from the reception buffer 202 in synchronization with clocks at a frequency Fs+da (Hz) generated by the processing clock generating unit 205 and output the converted data to the speaker 300 through the amplifier 204. Here, the processing clock generating unit 205 is a clock generator configured to generate clocks at an oscillation frequency Fs, and da is an error with respect to the oscillation frequency Fs of clocks actually generated in the processing clock generating unit 205.

Ideally, the sample rate Fs+dr of audio data output from the digital tuner 101 is matched with the frequency Fs+da of clocks generated by the processing clock generating unit 205. However, an error da−dr may not be eliminated between the sample rate Fs+dr of the audio data and the frequency Fs+da of clocks generated by the processing clock generating unit 205 because each radio broadcasting station 400 has an inherent and unsettled error in clocks in the radio broadcasting station 400 which operates in synchronization with operations of the digital tuner 101, because shifted clocks of the radio broadcasting station 400 if any are detected in the digital tuner 101 under some reception conditions, or because there is a generation error of the frequency of clocks in the processing clock generating unit 205.

On the other hand, ETHERNET AVB standard (IEEE802.1AS) provides a protocol in which one unit being a ground master transmits a SYNC message on a 125 ms cycle to another unit (being a slave) so that clocks in the units can be synchronized. By using this protocol, the processing clock generating unit 205 in the audio processing unit 200 can match the frequency Fs+da of clocks generated thereby with the sample rate Fs+dr of audio data output from the digital tuner 101 in the broadcasting receiving unit 100.

However, also in this case, until completion of the synchronization between the broadcasting receiving unit 100 and the audio processing unit 200 via a SYNC message on a 125 ms cycle, the error da−dr cannot be eliminated between the sample rate Fs+dr of audio data output from the digital tuner 101 and the frequency Fs+da of clocks generated by the processing clock generating unit 205. The completion of such synchronization between the broadcasting receiving unit 100 and the audio processing unit 200 via a SYNC message on a 125 ms cycle requires a period of at least 125 ms.

Therefore, when 0.125×(da−dr) or a difference between the number of clocks generated by the processing clock generating unit 205 (the number of audio data converted by the DAC 203) in 125 ms and the number of audio data output from the digital tuner 101 in 125 ms is equal to or higher than 1, an event that no audio data is available to be converted by the DAC occurs as indicated by "N/A" in FIG. 5, resulting in a drop out in output audio.

SUMMARY

Accordingly, it is an object of the present disclosure to output audio without sound drop out in an audio system in which different units perform reception and output of digital radio broadcasting.

In order to address this objective, the present disclosure provides an audio system including a broadcasting receiving unit configured to receive digital radio broadcasting, and an audio processing unit connected to the broadcasting receiving unit via a network and configured to process receive received by the broadcasting receiving unit from the digital radio broadcasting.

In this case, the broadcasting receiving unit has a digital tuner configured to receive digital radio broadcasting and output audio data, a rate conversion clock generating unit configured to generate rate conversion clocks at a predetermined frequency, a sample rate converting unit configured to convert audio data output from the digital tuner to audio data at a sample rate equal to a frequency of rate change clocks generated by the rate conversion clock generating unit, and a transmitting unit configured to transmit the audio data converted by the sample rate converting unit to the audio processing unit via the network and transmit a synchronization signal on a predetermined cycle to the audio processing unit via the network.

The audio processing unit has a receiving unit configured to receive the audio data and the synchronization signal from the broadcasting receiving unit via the network, a processing clock generating unit configured to generate processing clocks at the predetermined frequency, and an audio processor configured to process the audio data received by the receiving unit in synchronism with the processing clocks generated by the processing clock generating unit. The rate conversion clocks generated by the rate conversion clock generating unit in the broadcasting receiving unit are synchronized with the synchronization signal transmitted by the transmitting unit. The processing clock generating unit in the audio processing unit synchronizes the processing clocks with the synchronization signal received by the receiving unit.

In this audio system, audio data acquired by converting audio data received by the digital tuner to audio data at a sample rate having a predetermined frequency by the sample rate converting unit are processed in the audio processor. This can eliminate an influence of a change of the sample rate of audio data of digital radio broadcasting which is caused by some radio broadcasting station or under some reception conditions and can prevent sound drop out of output audio due to a large change of the sample rate of audio data of digital radio broadcasting.

Also in this audio system, a clock generating unit with proper precision is used as the rate conversion clock generating unit and as the processing clock generating unit. Thus, an audio system can be constructed such that it is assured that a value acquired by multiplying the predetermined cycle by a maximum value of a value acquired by subtracting a frequency of the rate conversion clocks from a frequency of the processing clocks is lower than 1, in consideration of precision of the frequency of the rate conversion clocks generated by the rate conversion clock generating unit and precision of the frequency of the processing clocks generated by the processing clock generating unit.

Because the value acquired by multiplying the predetermined cycle by a maximum value of a value acquired by subtracting a frequency of the rate conversion clocks from a frequency of the processing clocks is lower than 1, the number of processing clocks generated by the processing clock generating unit during the predetermined cycle is equal to the number of rate conversion clocks generated by the rate conversion clock generating unit (or the number of audio data output from the sample rate converting unit) during the predetermined cycle even when the number of processing clocks generated by the processing clock generating unit during the predetermined cycle of the synchronization signal (the number of audio data processed by the audio processor) is not equal to the number of audio data output from the digital tuner during the predetermined cycle.

Therefore, during a predetermined cycle until completion of synchronization of rate conversion clocks and processing clocks through a synchronization signal, an event in which no audio data is available to be processed by the audio processor can be prevented, which can also prevent sound drop out of the audio data processed by the audio processor.

Here, in the audio system as described above, the audio processor is a digital-analog converter configured to analog-convert the audio data received by the receiving unit in synchronism with the processing clocks generated by the processing clock generating unit and output the analog-converted audio.

Also in this case, the audio system further includes a speaker connected to the audio processing unit. The audio processing unit has an amplifier configured to amplify the audio analog-converted by the digital-analog converter and output the result to the speaker.

Also in the audio system as described above, the audio system is vehicle-mounted, and the network is an automotive network based on ETHERNET AVB standard.

According to the present invention, as described above, audio can be output without sound drop out in an audio system in which reception and output of digital radio broadcasting are performed by different units.

DETAILED DESCRIPTION OF THE DRAWINGS

Figure 1:
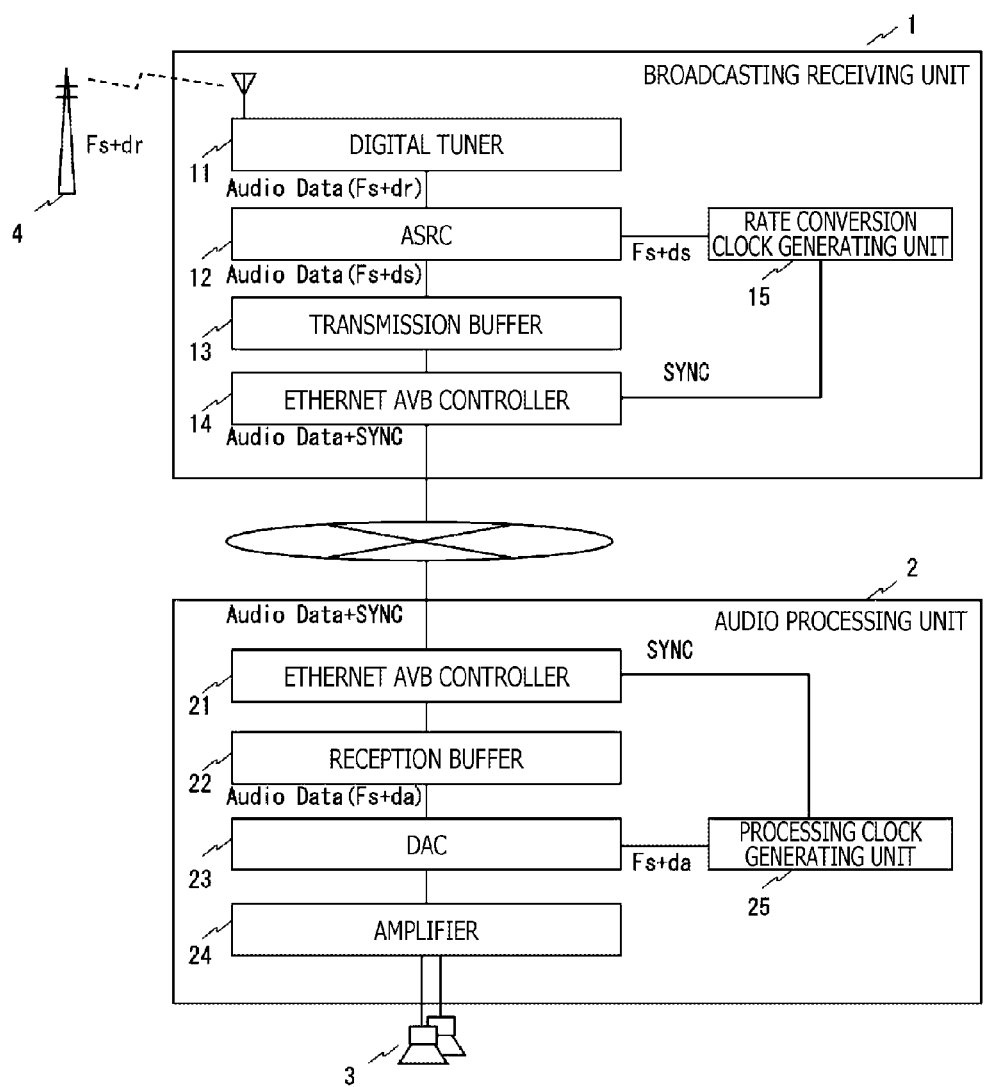
FIG. 1 is a block diagram illustrating a configuration of an audio system.

FIG. 1 illustrates a configuration of an audio system. The audio system is an audio system mounted in a vehicle and includes a broadcasting receiving unit 1 and an audio processing unit 2, as illustrated in FIG. 1. Here, a speaker 3 is connected to the audio processing unit 2, and the broadcasting receiving unit 1 and the audio processing unit 2 are connected via an automotive network based on ETHERNET AVB standard.

Next, the broadcasting receiving unit 1 includes a digital tuner 11 configured to receive digital radio broadcasting from a radio broadcasting station 4, an ASRC 12 (or an Asynchronous Sample Rate Converter 12), a transmission buffer 13, an ETHERNET AVB controller 14, and a rate conversion clock generating unit 15.

The audio processing unit 2 includes an ETHERNET AVB controller 21, a reception buffer 22, a DAC 23 (or a digital-analog converter 23), an amplifier 24, and a processing clock generating unit 25.

In this configuration, the digital tuner 11 in the broadcasting receiving unit 1 is configured to perform an operation for receiving digital radio broadcasting synchronized with clocks in the radio broadcasting station 4, which are contained in digital radio broadcasting for broadcasting, and output audio data having a sample rate Fs+dr(Hz). Here, Fs is a normal sample rate of audio data, and dr is an error with respect to the normal sample rate of the sample rate of audio data received from the radio broadcasting station 400.

On the other hand, the rate conversion clock generating unit 15 is configured to generate and output rate conversion clocks at a frequency Fs+ds (Hz). Here, the rate conversion clock generating unit 15 is a clock generator configured to generate clocks at an oscillation frequency Fs, and ds is an error with respect to the oscillation frequency Fs of the rate conversion clocks actually generated in the rate conversion clock generating unit 15. A maximum value of ds can be acquired in advance as a precision of the rate conversion clock generating unit 15.

The ASRC 12 uses the rate conversion clocks at the frequency Fs+ds (Hz), which are output from the rate conversion clock generating unit 15, to rate-convert audio data with the sample rate Fs+dr (Hz), which are output from the digital tuner 11, to audio data with the sample rate Fs+ds (Hz) and stores the converted audio data in the transmission buffer 13.

Figure 2:
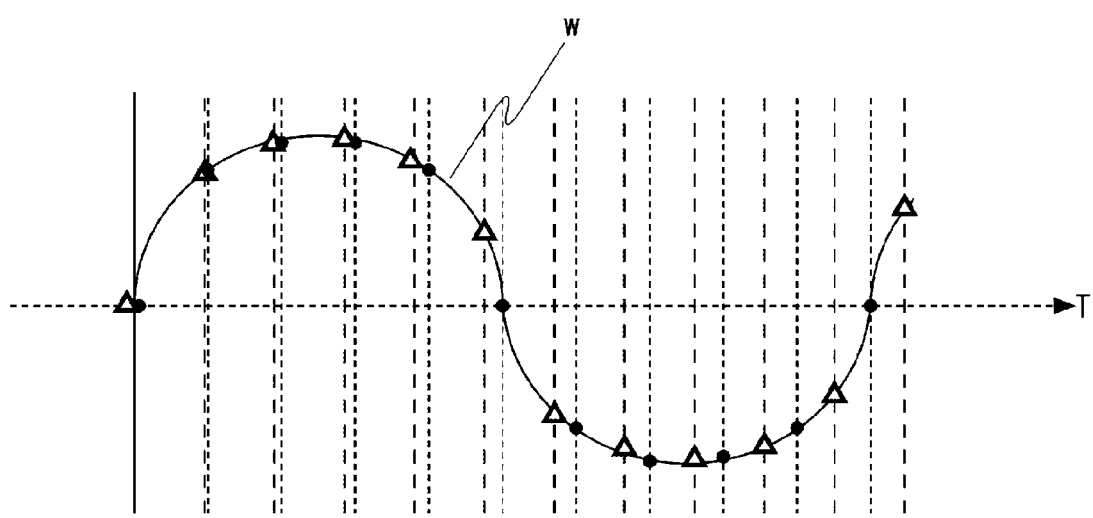
FIG. 2 illustrates a conversion example of a sample rate in an ASRC.

Here, as schematically illustrated in FIG. 2, the term "rate convert" in the ASRC 12 fundamentally refers to generation of audio data, which are represented by triangles in FIG. 2, by sampling, at a sample rate different from that of original audio data, an audio waveform w acquired by interpolating the original audio data, which are represented by circles in FIG. 2.

Next, after the audio data is stored in the transmission buffer 13, the ETHERNET AVB controller 14 in the broadcasting receiving unit 1 is configured to transmit the stored audio data to the audio processing unit 2. The ETHERNET AVB controller 14 in the broadcasting receiving unit 1 is configured to transmit a SYNC message to the audio processing unit 2 on a 125 ms cycle.

Here, the transmission timing of the SYNC message is also transmitted to the rate conversion clock generating unit 15 so that the rate conversion clock generating unit 15 can synchronize rate conversion clocks generated by the rate conversion clock generating unit 15 with the transmission timing of the SYNC message. However, in the ETHERNET AVB controller 14, the SYNC message may be transmitted in synchronism with the rate conversion clocks.

Next, the ETHERNET AVB controller 21 in the audio processing unit 2 is configured to receive the audio data and SYNC message transmitted from the broadcasting receiving unit 1 and store the received audio data in the reception buffer 22. The DAC 23 is configured to read and analog-convert audio data from the reception buffer 22 in synchronism with output clocks at the frequency Fs+da(Hz), which are generated by the processing clock generating unit 25 and output the converted audio data to the speaker 3 connected to the audio processing unit 2 through the amplifier 24. Here, the processing clock generating unit 25 is a clock generator configured to generate clocks at the oscillation frequency Fs, and da is an error with respect to the oscillation frequency Fs of output clocks actually generated in the processing clock generating unit 25. A maximum value of da can be acquired in advance as a precision of the processing clock generating unit 25.

Here, the ETHERNET AVB controller 21 also transmits the SYNC message received from the broadcasting receiving unit 1 to the processing clock generating unit 25 so that the processing clock generating unit 25 can synchronize output clocks with the SYNC message.

The processing clock generating unit 25 in the audio processing unit 2 and the rate conversion clock generating unit 15 in the broadcasting receiving unit 1 have a center frequency and a maximum error (precision) which may assure that a value $(da-ds) \times TS$ acquired by multiplying TS by a difference $da-ds$ between the frequency Fs+da (Hz) of output clocks generated by the processing clock generating unit 25 and the frequency Fs+ds (Hz) of rate conversion clocks output from the rate conversion clock generating unit 15 can be lower than 1 where TS is a cycle of 125 ms of a SYNC message or a time acquired by adding a predetermined margin to 125 ms.

Figure 3:
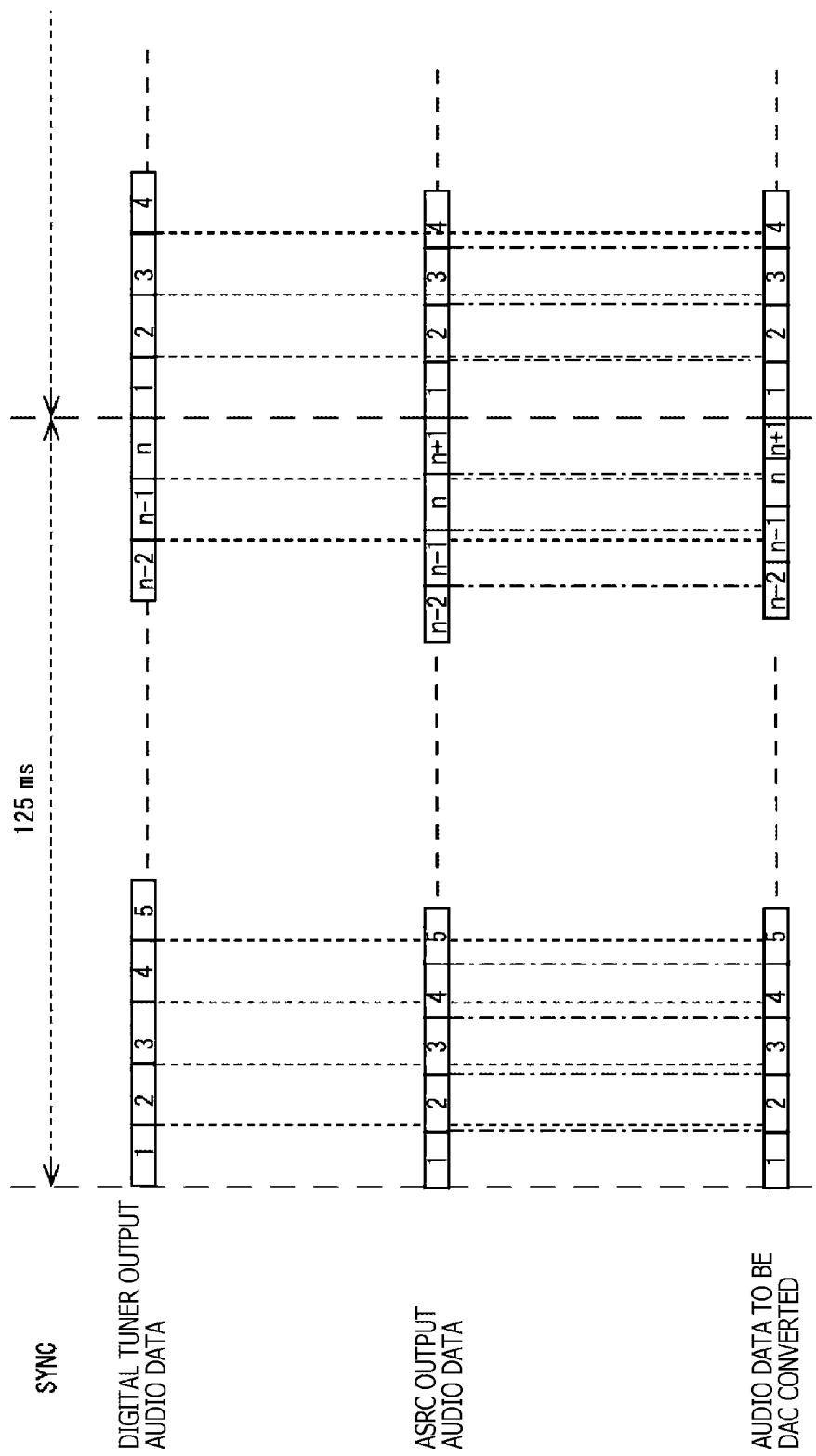
FIG. 3 illustrates operations of an audio system.
Figure 4:
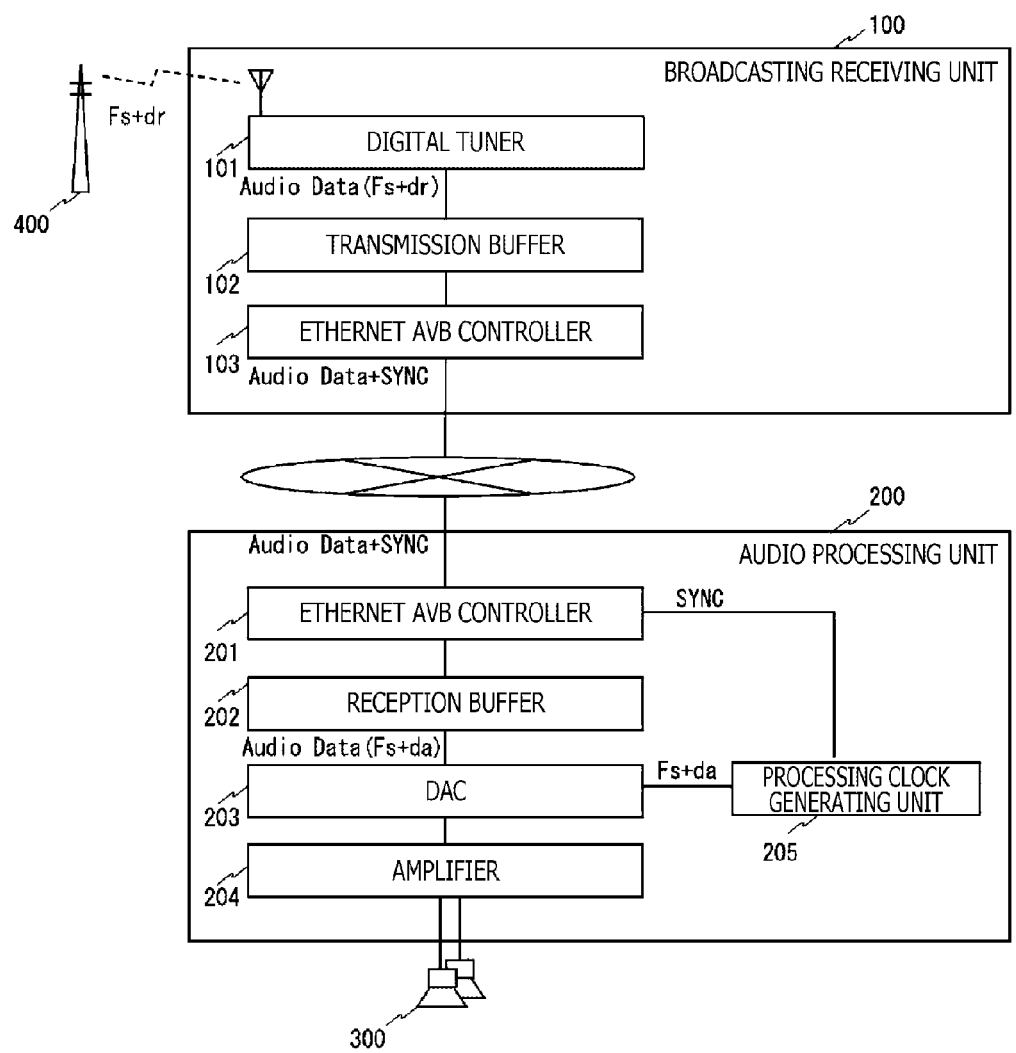
FIG. 4 is a block diagram illustrating a configuration of a conventional audio system.
Figure 5:
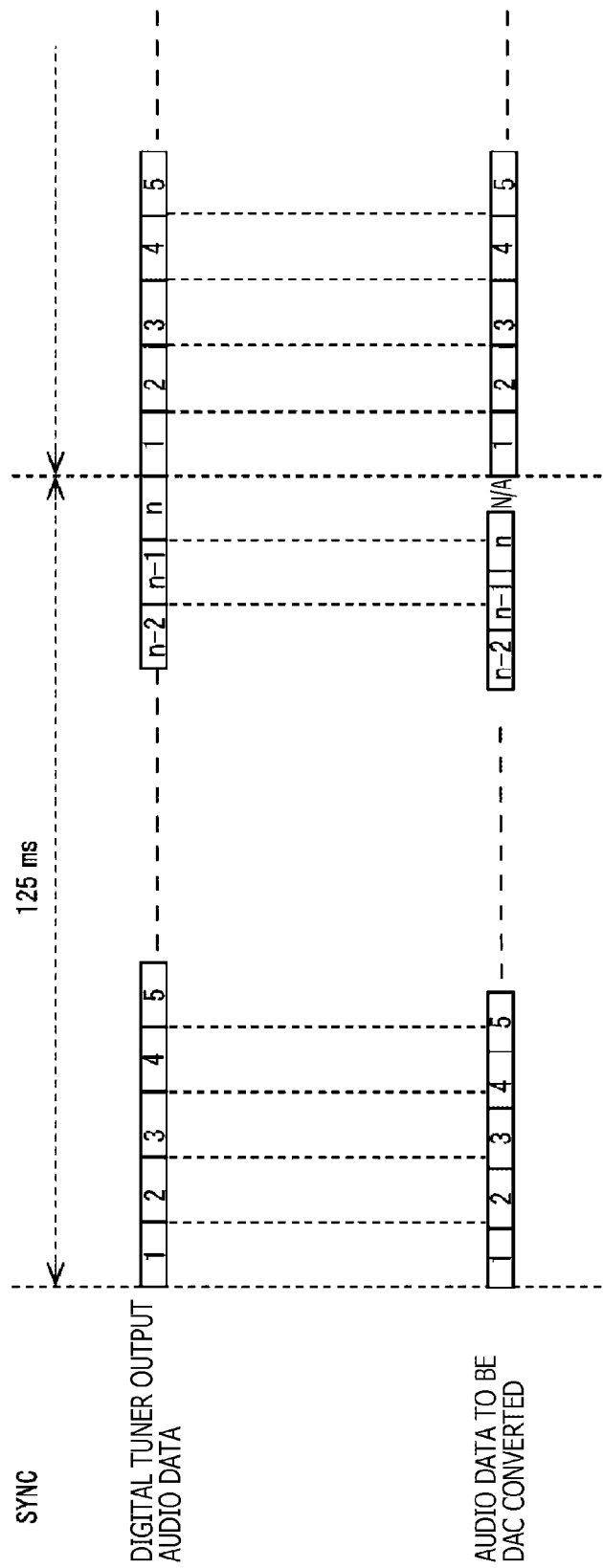
FIG. 5 illustrates how sound drop out occurs in a conventional audio system.

The processing clock generating unit 25 in the audio processing unit 2 and the rate conversion clock generating unit 15 in the broadcasting receiving unit 1 which can assure that $(da-ds) \times TS$ is lower than 1 are used so that the number of clocks generated by the processing clock generating unit 25 in a cycle of cycle 125 ms of a SYNC message (or the number of audio data converted by the DAC 23) and the number of audio data output from the ASRC 12 in 125 ms can be equal even when the number of clocks generated by the processing clock generating unit 25 in 125 ms and the number of audio data output from the digital tuner 11 in 125 ms are not equal, as illustrated in FIG. 3.

Thus, during a period of 125 ms until completion of synchronization of rate conversion clocks from the broadcasting receiving unit 1 and output clocks from the audio processing unit 2 through a SYNC message on a 125 ms cycle, an event that no audio data is available to be converted by the DAC 23 does not occur, which can prevent drop out of output audio.

Up to this point, one implementation of the present disclosure has been described. In the described implementation, audio data acquired by converting audio data received by the digital tuner 11 to a sample rate at a predetermined frequency by the ASRC 12 are used for subsequent audio data processing. This can reduce or eliminate influences of changes of the sample rate of audio data in digital radio broadcasting caused by some radio broadcasting stations or under some reception conditions and can suppress drop out of output audio due to a large change of the sample rate of audio data in digital radio broadcasting.

Furthermore, it is assured that a value $(da-ds) \times TS$ acquired by multiplying TS by a difference $da-ds$ between the frequency Fs+da (Hz) of output clocks generated by the processing clock generating unit 25 and the frequency Fs+ds (Hz) of rate conversion clocks output from the rate conversion clock generating unit 15 can be lower than 1 where TS is a cycle of 125 ms of a SYNC message or a time acquired by adding a predetermined margin to 125 ms. Thus, drop out of output audio can be securely suppressed.

It is therefore intended that the foregoing detailed description be regarded as illustrative rather than limiting, and that it be understood that it is the following claims, including all equivalents, that are intended to define the spirit and scope of this invention.

What is claimed is:

1. An audio system comprising:
   a broadcasting receiving unit configured to receive digital radio broadcasting; and
   an audio processing unit connected to the broadcasting receiving unit via a network and configured to process audio received by the broadcasting receiving unit from the digital radio broadcasting;
   wherein the broadcasting receiving unit has:
   a digital tuner configured to receive digital radio broadcasting and output audio data;
   a rate conversion clock generating unit configured to generate rate conversion clocks at a predetermined frequency;
   a sample rate converting unit configured to convert audio data output from the digital tuner to audio data at a sample rate equal to a frequency of rate change clocks generated by the rate conversion clock generating unit; and
   a transmitting unit configured to transmit the audio data converted by the sample rate converting unit to the audio processing unit via the network and to transmit a synchronization signal on a predetermined cycle to the audio processing unit via the network;
   wherein the audio processing unit has:

a receiving unit configured to receive the audio data and the synchronization signal from the broadcasting receiving unit via the network;

a processing clock generating unit configured to generate processing clocks at the predetermined frequency; and an audio processor configured to process the audio data received by the receiving unit in synchronism with the processing clocks generated by the processing clock generating unit, wherein the rate conversion clocks generated by the rate conversion clock generating unit in the broadcasting receiving unit are synchronized with the synchronization signal transmitted by the transmitting unit;

wherein the processing clock generating unit in the audio processing unit synchronizes the processing clocks with the synchronization signal received by the receiving unit; and wherein a value acquired by multiplying the predetermined cycle by a maximum value of a value acquired by subtracting the frequency of the rate conversion clocks from the frequency of the processing clocks is lower than 1.

2. The audio system according to claim 1, wherein the value acquired by multiplying the predetermined cycle by the maximum value of the value acquired by subtracting the frequency of the rate conversion clocks from the frequency of the processing clocks is determined in consideration of the precision of the frequency of the rate conversion clocks generated by the rate conversion clock generating unit and the precision of the frequency of the processing clocks generated by the processing clock generating unit.

3. The audio system according to claim 1, wherein the audio processor is a digital-analog converter configured to analog-convert the audio data received by the receiving unit in synchronism with the processing clocks generated by the processing clock generating unit and output the analog-converted audio.

4. The audio system according to claim 3, further comprising:

a speaker connected to the audio processing unit, wherein the audio processing unit has an amplifier configured to amplify the audio analog-converted by the digital-analog converter and output the result to the speaker.

5. The audio system according to claim 1, wherein the audio system is vehicle-mounted; and wherein the network is an automotive network based on ETHERNET Audio Video Bridging (AVB) standard.

* * * * *